(12) United States Patent
Mitchell

(10) Patent No.: US 8,009,990 B1
(45) Date of Patent: Aug. 30, 2011

(54) OPTICAL PHASED ARRAY

(75) Inventor: James P. Mitchell, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 473 days.

(21) Appl. No.: 12/150,918

(22) Filed: May 1, 2008

Related U.S. Application Data

(63) Continuation-in-part of application No. 11/143,549, filed on Jun. 2, 2005, now Pat. No. 7,606,496.

(51) Int. Cl.
*H04B 10/00* (2006.01)
(52) U.S. Cl. ......... 398/118; 398/122; 398/129; 398/131
(58) Field of Classification Search ........... 398/118–131
See application file for complete search history.

(56) References Cited

U.S. PATENT DOCUMENTS

| | | | | |
|---|---|---|---|---|
| 3,243,592 A * | 3/1966 | Kiyo et al. | ..................... | 398/125 |
| 3,427,611 A * | 2/1969 | Enenstein | ..................... | 342/54 |
| 4,079,246 A * | 3/1978 | Misek | ..................... | 398/161 |
| 4,493,114 A * | 1/1985 | Geller et al. | ..................... | 398/119 |
| 5,117,301 A * | 5/1992 | Tsumura | ..................... | 398/170 |
| 5,175,664 A * | 12/1992 | Diels et al. | ..................... | 361/213 |
| 5,301,051 A * | 4/1994 | Geller | ..................... | 398/118 |
| 5,726,855 A * | 3/1998 | Mourou et al. | ..................... | 361/213 |
| 6,137,609 A * | 10/2000 | Scheps | ..................... | 398/125 |
| 6,175,437 B1 * | 1/2001 | Diels et al. | ..................... | 398/201 |
| 6,239,888 B1 * | 5/2001 | Willebrand | ..................... | 398/129 |
| 6,255,990 B1 * | 7/2001 | King | ..................... | 342/377 |
| 6,304,354 B2 * | 10/2001 | Carlson | ..................... | 398/129 |
| 6,323,980 B1 * | 11/2001 | Bloom | ..................... | 398/129 |
| 6,347,001 B1 * | 2/2002 | Arnold et al. | ..................... | 398/122 |
| 6,462,704 B2 * | 10/2002 | Rexberg et al. | ..................... | 342/174 |
| 6,493,122 B1 * | 12/2002 | Degura | ..................... | 398/128 |
| 6,501,578 B1 * | 12/2002 | Bernstein et al. | ..................... | 398/201 |
| 7,027,676 B2 * | 4/2006 | VanWiggeren et al. | ..................... | 385/14 |
| 7,177,550 B1 * | 2/2007 | Smith | ..................... | 398/212 |
| 7,236,705 B2 * | 6/2007 | Moursund et al. | ..................... | 398/129 |
| 7,406,263 B2 * | 7/2008 | Graves et al. | ..................... | 398/119 |
| 7,489,870 B2 * | 2/2009 | Hillis et al. | ..................... | 398/115 |

(Continued)

OTHER PUBLICATIONS

"Terrain", Roget's II The New Thesaurus (2003).*

(Continued)

*Primary Examiner* — Ken Vanderpuye
*Assistant Examiner* — Danny Leung
(74) *Attorney, Agent, or Firm* — Daniel M. Barbieri

(57) ABSTRACT

A transmitter modulates a laser beam with data and projects the laser beam. A first and second optical detector indirectly receive a first and second signal (respectively) via light scattered from a first and second segment of the laser beam at a first and second time. The first segment at the first time and the second segment at the second time are modulated with the same data. The receiver phases the first signal and/or the second signal to match their phase and sums the signals. The transmitter and/or the receiver may include a terrain database and/or an order wire for sharing terrain and/or position information. Terrain information and/or position information may be utilized to align the laser beam with the optical detector(s) and/or adjust an aperture of the optical detector(s) to minimize intersymbol interference and maximize communication channel benefits associated with spatial and temporal diversity.

5 Claims, 10 Drawing Sheets

U.S. PATENT DOCUMENTS

| | | | | |
|---|---|---|---|---|
| 7,555,217 B2 * | 6/2009 | Hillis et al. | .................... | 398/115 |
| 7,606,496 B1 * | 10/2009 | Mitchell | ........................ | 398/125 |
| 7,609,972 B2 * | 10/2009 | Cunningham et al. | ......... | 398/118 |
| 7,639,951 B2 * | 12/2009 | Hirayama | ..................... | 398/128 |
| 2003/0058506 A1 * | 3/2003 | Green et al. | ................... | 359/172 |
| 2003/0122709 A1 * | 7/2003 | Jeon et al. | ...................... | 342/372 |
| 2004/0141753 A1 * | 7/2004 | Andreu-von Euw et al. | . | 398/122 |
| 2004/0161239 A1 * | 8/2004 | Bruesselbach et al. | ........ | 398/131 |
| 2006/0209978 A1 * | 9/2006 | Jungnickel et al. | ............ | 375/267 |
| 2006/0210279 A1 * | 9/2006 | Hillis et al. | .................... | 398/118 |
| 2006/0239686 A1 * | 10/2006 | Hillis et al. | .................... | 398/115 |
| 2007/0122155 A1 * | 5/2007 | Hillis et al. | .................... | 398/115 |
| 2007/0253713 A1 * | 11/2007 | Reilly et al. | ..................... | 398/96 |
| 2008/0212970 A1 * | 9/2008 | Shpantzer | ..................... | 398/118 |
| 2008/0310847 A1 * | 12/2008 | Shpantzer et al. | ............. | 398/115 |
| 2009/0169221 A1 * | 7/2009 | Cho et al. | ...................... | 398/214 |
| 2009/0269083 A1 * | 10/2009 | Cho et al. | ...................... | 398/212 |
| 2010/0014873 A1 * | 1/2010 | Bulow | .......................... | 398/159 |

OTHER PUBLICATIONS

Alexander L. Gaeta, Collapsing Light Really Shines, Jul. 4, 2003, pp. 54-55, vol. 301, Publisher: Science , Published in: US.

Ewan Wright, et al., Research on 'Light Strings' A Potential Industry Boon, Jul. 23, 1999, Publisher: http://www.sciencedaily.com/releases/1999/07/990722134232.htm, Published in: US.

A. Braun, et al., Self-Channeling of High-Peak-Power Femtosecond Laser Pulses in Air, Jan. 1, 1995, pp. 73-75, vol. 20, No. 1, Publisher: Optics Letters, Published in: US.

Aaron Michael Stark, Ultraviolet Non-Line of Site Digital Communications, May 2003, Publisher: http://www.ece.unh.edu/svpal/Thesis/Aaron%20Stark/EE995_UVpaper_R11.pdf, Published in: US.

Gary A. Shaw, et al., Ultraviolet Comm Links for Distributed Sensor Systems, Oct. 2005, Publisher: http://www.ieee.org/orgnizations/pubs/newsletters/leos/oct05/ultraviolet.html, Published in: US.

* cited by examiner

OPTICAL PHASED ARRAY

CROSS-REFERENCE TO RELATED APPLICATIONS

The present application constitutes a continuation-in-part of and claims priority under 35 U.S.C. §120 to U.S. patent application Ser. No. 11/143,549, filed Jun. 2, 2005, now U.S. Pat. No. 7,606,496 entitled "COMMUNICATIONS AND POSITION LOCATION SYSTEM AND METHOD," which is incorporated herein by reference.

TECHNICAL FIELD

The present disclosure generally relates to the field of communications, and more particularly to non-line-of-sight communications.

BACKGROUND

Global positioning system (GPS) navigational and position location systems are often used by military and civilian naval, ground, and airborne vehicles for navigation. GPS systems can experience blackout areas or regions when line-of-site (LOS) is broken with the satellites due to signal blockage. For example GPS systems often experience loss of signal when they are operated in dense urban environments next to large buildings (e.g., urban canyon).

Communications systems operating in the VHF/UHF and higher frequency bands have LOS problems similar to GPS. Vehicles operating in a city or in rugged or mountainous terrain have difficulty communicating due to signal link-loss and blockage. Furthermore, there are few technical options for delivering high-speed data, video, and position location information from a mobile unit or a large number of mobile units. For example, mobile units may include emergency response vehicles requiring broadband (last-mile) transmission of video from an emergency scene back to an emergency operations center. Rough terrain, line-of sight, ground network infrastructure and antenna technical challenges generally force or limit options having lower or unsatisfactory bit rate solutions.

LOS laser communications systems provide end-to-end or point-to-point systems where a laser transmitter must be pointed directly at a laser receiver to establish communications. As with some radio communications systems, these laser communications systems are not useable in rough terrain or urban canyon situations.

SUMMARY

A system, method, and receiver for non-line-of-sight communications utilizing a laser beam are disclosed. A transmitter may modulate a laser beam with data from a data source and project the laser beam over a horizon. The laser beam may travel and transport the data in a path through the atmosphere from the transmitter. The horizon may include any obstruction in the line of sight of the transmitter including, but not limited to, a hill, a mountain, a building, vegetation, a vehicle, and/or other obstruction. Atmospheric scattering scatters some percentage of the light from the laser beam as the laser beam travels through the atmosphere.

A first optical detector of a receiver may indirectly receive the light scattered by atmospheric scattering from a first segment of the laser beam at a first time and receive a first signal via the light scattered by atmospheric scattering from the first segment of the laser beam at the first time. A data clock may be recovered by well known methods including, but not limited to, Manchester encoding and decoding. This recovered clock may be utilized to identify bit boundaries, maximizing energy collected for each bit. A second optical detector of the receiver may indirectly receive the light scattered by atmospheric scattering from a second segment (spatial diversity) of the laser beam at a second time (temporal diversity) and receive a second signal via the light scattered by atmospheric scattering from the second segment of the laser beam at the second time. A data clock may be recovered by well known methods including, but not limited to, Manchester encoding and decoding. This recovered clock may be utilized to identify bit boundaries, maximizing energy collected for each bit.

The laser beam may be modulated with the same data at the first segment at the first time and the second segment at the second time. The receiver may phase the first signal and/or the second signal to match the phase of the signals. By matching the phase of the signals, each of the signals is modulated with the same data. After phasing the first signal and/or the second signal, the receiver may sum the first signal and the second signal to produce a summed signal. By summing the separate signals, which are modulated with the same data, the power, the uncorrelated power-to-noise ratio, and/or the data rate of the summed signal may yield an improved aggregate signal over the individual signals. The receiver may process the first signal, the second signal, and/or the summed signal utilizing spread spectrum analysis to suppress noise relative to the signal (i.e. processing gain).

The transmitter may utilize one or more laser diodes of various power levels and wavelengths (utilizing any optical band) (including, but not limited to, green, blue, and/or blue violet) to modulate and project the laser beam. The optical detector(s) may include an adjustable optical field of view and gain to minimize background light noise and to demodulate the received scattered laser beam light. The adjustable optical field of view may be manually adjustable or automatically adjustable (including, but not limited to, open and/or closed feedback methods relying on position and received Bit-Error-Rate (BER)). The optical detector(s) may include one or more filters for controlling the light wavelength received by the optical detectors. The optical detector(s) may comprise an electronic device, an optical device, and/or a hybrid electronic/optical device. The transmitter and/or the receiver may be mounted at a fixed location, be mounted on a vehicle, and/or comprise a portable unit such as an equipment suitcase.

The transmitter and/or the receiver may include a terrain database. The terrain database may include terrain information concerning one or more locations. The transmitter and the receiver may be communicably connected via an order wire. The order wire may comprise an inherently low-bandwidth wireless order wire. The transmitter and the receiver may share terrain information and/or position information via the order wire. The position information may comprise GPS (global positioning system) information. The transmitter may utilize the position information of the receiver to align the laser beam with the optical detector(s) of the receiver. The receiver may utilize the terrain information and/or the position information of the transmitter to align the optical detector(s) with the laser beam. The order wire may comprise a narrowband radio frequency (RF) connection. The receiver may utilize the terrain information and/or the position information of the transmitter to compute a geometric projection of the modulation of the data in the laser beam and may adjust an aperture of the optical detector(s) based on the geometric projection to minimize intersymbol interference and maximize the communication channel benefits associated with spatial and temporal diversity.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Laser beams may be propagated for many miles through the atmosphere, subsequently forming atmospheric light filaments or light strings. Light strings have been demonstrated to produce a light source six miles in the sky. The light string phenomenon is described in Optics Letters, Volume 20, Issue 1, 73-75, January. 1995 "Self-channeling of high-peak-power femtosecond laser pulses in air" by A. Braun et al., which is incorporated herein in its entirety. High-peak power extremely short laser pulses may have pulse widths of 100 femtoseconds ($100 \times 10^{-15}$ seconds).

With long laser light pulses, the laser light does not propagate as a string, but produces an electrical discharge that breaks down instantly and terminates the propagation as described in a Science Daily on-line article "Research on Light Strings A Potential Industry Boon" from the University of Arizona Jul. 23, 1999, which is incorporated herein in its entirety. With long pulses, the atoms of air are torn apart and the laser light does not propagate. If the pulses are ultra-short, they do not have enough energy to pull many electrons from the surrounding air molecules. Instead, the ultra-short pulses create a low-energy, electrically charged air channel in which laser light propagates through the atmosphere forming the light strings and also generates atmospheric scatter from the laser beam.

Figure 1:
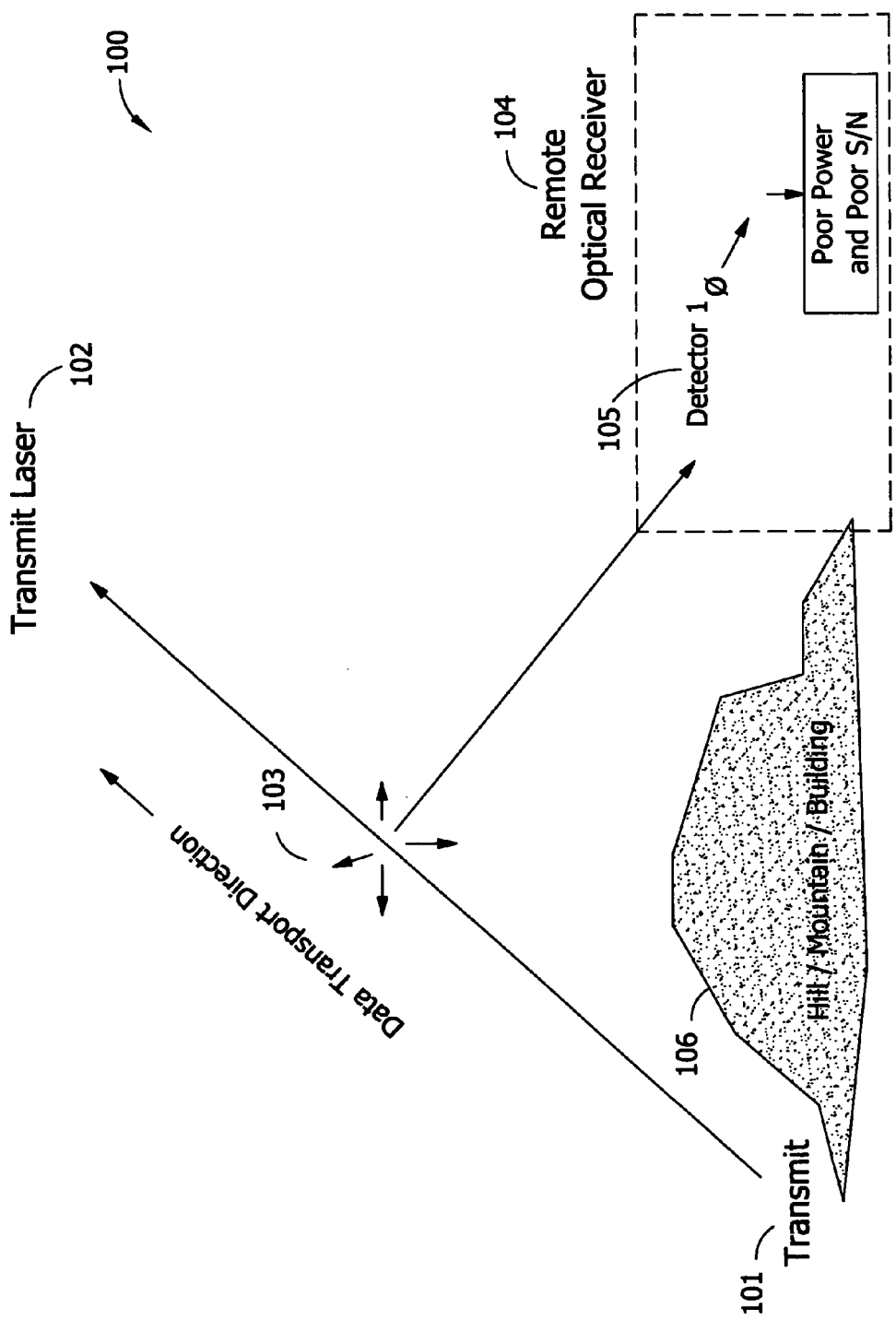
FIG. 1 is a diagram illustrating a system for non-line-of-sight communications utilizing a laser beam.

FIG. 1 illustrates a system 100 for non-line-of-sight communications utilizing a laser beam. A transmitter 101 modulates a laser beam 102 with data from a data source and projects the laser beam 102 over a horizon 106. The laser beam 102 may travel and transport the data in a path through the atmosphere from the transmitter 101. An optical detector 105 of a receiver 104 may indirectly receive the light scattered by atmospheric scattering from a segment 103 of the laser beam 102 and receive a signal via the light scattered by atmospheric scattering from the segment 103 of the laser beam 102. The receiver 104 may demodulate the signal received by the optical detector 105 to obtain the data.

Figure 2:
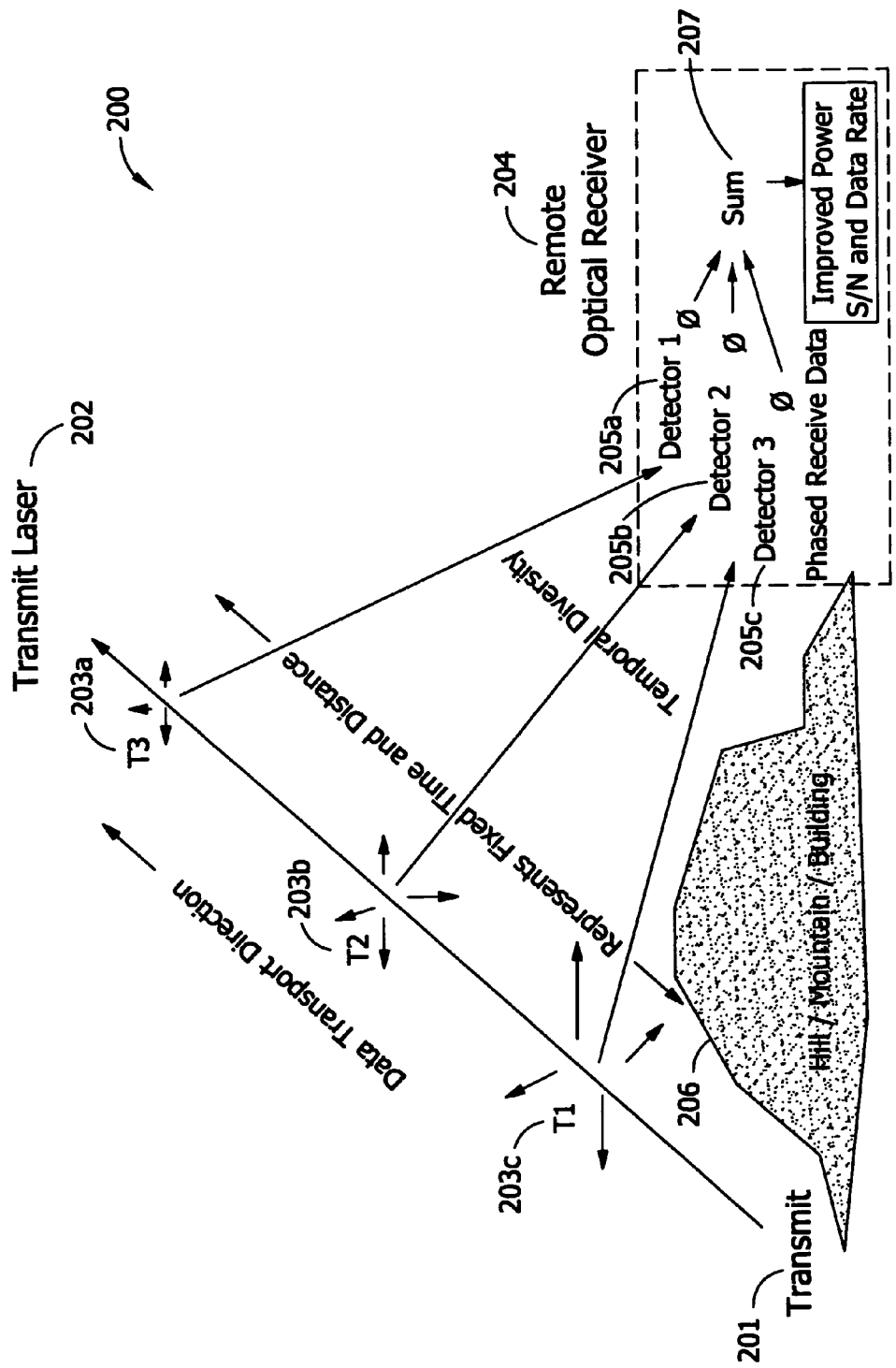
FIG. 2 is a diagram illustrating a system for non-line-of-sight communications utilizing a laser beam, in accordance with an embodiment of the present disclosure.

FIG. 2 illustrates a system 200 for non-line-of-sight communications utilizing a laser beam which may have improved signal power, signal to noise ratio, and data rate over the system 100 of FIG. 1, in accordance with an embodiment of the present disclosure. A transmitter 201 modulates a laser beam 202 with data from a data source and projects the laser beam 202 over a horizon 206. The laser beam 102 may comprise a single laser beam and/or an aggregate of a plurality of single laser beams. The laser beam 202 may travel and transport the data in a path through the atmosphere from the transmitter 201. The transmitter 201 may utilize the light string phenomenon with ultra-short pulses. The transmitter 201 may utilize normal continuous wave laser light propagation. The horizon 206 may include any obstruction in the line of sight of the transmitter 201 including, but not limited to, a hill, a mountain, a building, vegetation, a vehicle, and/or other obstruction. Atmospheric scatter may be generated from the laser beam 202 as the laser beam 202 travels through the atmosphere. The atmospheric scatter may occur due to air molecules, water droplets such as rain, snow fog, clouds, dust particles, and/or other particles. Atmospheric scattering scatters some percentage of the light from the laser beam 202 as the laser beam 202 travels through the atmosphere.

An optical detector 205c of a receiver 204 may indirectly receive the light scattered by atmospheric scattering from a first segment 203c of the laser beam 202 at a first time and receive a signal via the light scattered by atmospheric scattering from the first segment 203c of the laser beam 202 at the first time. An optical detector 205b of the receiver 204 may indirectly receive the light scattered by atmospheric scattering from a second segment (spatial diversity) 203b of the laser beam 202 at a second time (temporal diversity) and receive a signal via the light scattered by atmospheric scattering from the second segment 203b of the laser beam 202 at the second time. An optical detector 205a of the receiver 204 may indirectly receive the light scattered by atmospheric scattering from a third segment (spatial diversity) 203a of the laser beam 202 at a third time (temporal diversity) and receive a signal via the light scattered by atmospheric scattering from the third segment 203a of the laser beam 202 at the third time. The optical detectors 205c, 205b, and/or 205a may each comprise an electronic device, an optical device, and/or a hybrid electronic/optical device.

The transmitter may modulate the laser beam 203 with the same data at the first segment 203c at the first time, the second segment 203b at the second time, and the third segment 203a at the third time. The receiver 204 may phase the signal received by the optical detector 205c, the signal received by the optical detector 205b, and/or the signal received by the optical detector 205a to match the phase of each of the signals with the other signals. A data clock may be recovered by well known methods including, but not limited to, Manchester encoding and decoding. This recovered clock may be utilized to identify bit boundaries, maximizing energy collected for each bit. By matching the phase of each of the signals with the other signals, each of the signals is modulated with the same data. After phasing the signal received by the optical detector 205c, the signal received by the optical detector 205b, and/or the signal received by the optical detector 205a, the receiver 204 may sum 207 the signal received by the optical detector 205c, the signal received by the optical detector 205b, and/or the signal received by the optical detector 205a to produce a summed signal. By summing the separate signals, which are modulated with the same data, the power, the uncorrelated power-to-noise ratio, and/or the data rate of the summed signal may yield an improved aggregate signal over the individual signals. The summed signal may be recorded in a tangible medium including, but not limited to, a memory, a register, a compact disk, a hard disk, and/or a floppy disk. The summed signal may displayed utilizing a display device including, but not limited to, a cathode-ray tube display, a liquid crystal display, a speaker, a graphic equalizer, and/or a printer. The receiver 204 may process the signal received by the optical detector 205c, the signal received by the optical detector 205b, and/or the signal received by the optical detector 205a utilizing spread spectrum analysis to suppress noise relative to the signal (i.e. processing gain). The receiver 204 may process the summed signal utilizing spread spectrum analysis to suppress noise relative to the signal (i.e. processing gain). The receiver 204 may demodulate the summed signal to obtain the data. The data may be recorded in a tangible medium including, but not limited to, a memory, a register, a compact disk, a hard disk, and/or a floppy disk. The data may displayed utilizing a display device including, but not limited to, a cathode-ray tube display, a liquid crystal display, a speaker, a graphic equalizer, and/or a printer.

Although this embodiment has been described with three optical detectors, it should be understood that different numbers of optical detectors, such as two or fifty, may be utilized without departing from the scope of the present disclosure. The transmitter 201 may utilize one or more laser diodes of various power levels and wavelengths (utilizing any optical band) (including, but not limited to, green, blue, and/or blue violet) to modulate and project the laser beam 202. The optical detectors 205c, 205b, and 205c may include an adjustable optical field of view and gain to minimize background light noise and to demodulate the received scattered laser beam light. The adjustable optical field of view may be manually adjustable or automatically adjustable (including, but not limited to, open and/or closed feedback methods relying on position and received Bit-Error-Rate (BER)). The optical detectors 205c, 205b, and/or 205c may include one or more filters for controlling the light wavelength received by the optical detectors 205c, 205b, and/or 205c. The transmitter 201 and/or the receiver 204 may be mounted at a fixed location, be mounted on a vehicle, and/or comprise a portable unit such as an equipment suitcase.

Figure 3:
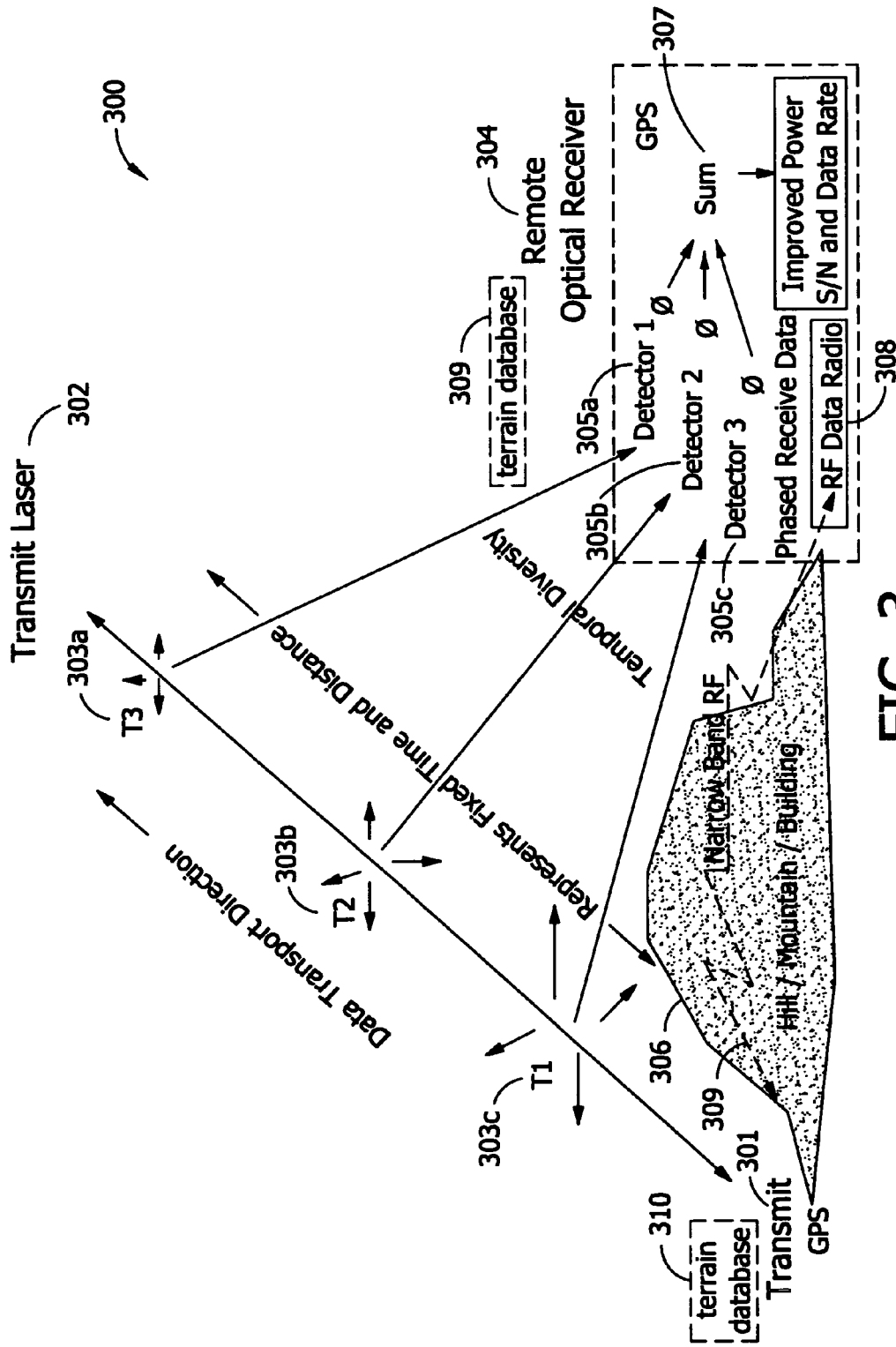
FIG. 3 is a diagram illustrating a system for non-line-of-sight communications utilizing a laser beam, in accordance with an alternative embodiment of the present disclosure.

FIG. 3 illustrates a system 300 for non-line-of-sight communications utilizing a laser beam which may have improved signal power, signal to noise ratio, and data rate over the system 100 of FIG. 1, in accordance with an alternative embodiment of the present disclosure. A transmitter 301 modulates a laser beam 302 with data from a data source and projects the laser beam 302 over a horizon 306. The laser beam 102 may comprise a single laser beam and/or an aggregate of a plurality of single laser beams. The laser beam 302 may travel and transport the data in a path through the atmosphere from the transmitter 301. The transmitter 301 may utilize the light string phenomenon with ultra-short pulses. The transmitter 301 may utilize normal continuous wave laser light propagation. The horizon 306 may include any obstruction in the line of sight of the transmitter 301 including, but not limited to, a hill, a mountain, a building, vegetation, a vehicle, and/or other obstruction. Atmospheric scatter may be generated from the laser beam 302 as the laser beam 302 travels through the atmosphere. The atmospheric scatter may occur due to air molecules, water droplets such as rain, snow fog, clouds, dust particles, and/or other particles. Atmospheric scattering scatters some percentage of the light from the laser beam 302 as the laser beam 302 travels through the atmosphere.

An optical detector 305c of a receiver 304 may indirectly receive the light scattered by atmospheric scattering from a first segment 303c of the laser beam 302 at a first time and receive a signal via the light scattered by atmospheric scattering from the first segment 303c of the laser beam 302 at the first time. An optical detector 305b of the receiver 304 may indirectly receive the light scattered by atmospheric scattering from a second segment (spatial diversity) 303b of the laser beam 302 at a second time (temporal diversity) and receive a signal via the light scattered by atmospheric scattering from the second segment 303b of the laser beam 302 at the second time. An optical detector 305a of the receiver 304 may indirectly receive the light scattered by atmospheric scattering from a third segment (spatial diversity) 303a of the laser beam 302 at a third time (temporal diversity) and receive a signal via the light scattered by atmospheric scattering from the third segment 303a of the laser beam 302 at the third time. The optical detectors 305c, 305b, and/or 305a may each comprise an electronic device, an optical device, and/or a hybrid electronic/optical device.

The transmitter 301 may include a terrain database 310. The receiver 304 may include a terrain database 309. The terrain databases 310 and 309 may include terrain information concerning one or more locations. Terrain information contained in the terrain databases 310 and 309 may include, but is not limited to, information concerning land topography, land elevation, vegetation, man-made structures (including, but not limited to, buildings, vehicles, power lines, towers, antennas, roads, dams, bridges and/or landing strips), landforms, bodies of water, hazards, mountains, weather information, and/or airspace classifications. The transmitter 301 and the receiver 304 may be communicably connected via an order wire 309. An order wire is a connection for sharing control information between a transmitter and a receiver. The transmitter 301 and the receiver 304 may share position information and/or terrain information via the order wire 309. The order wire may comprise an inherently low-bandwidth wireless order wire. The position information may comprise GPS (global positioning system) information. The transmitter 301 may utilize the terrain information and/or the position information of the receiver 304 communicated via the order wire 309 to align the laser beam 302 with the optical detectors 305c, 305b, and/or 305a of the receiver 304. The receiver 304 may utilize the terrain information and/or the position information of the transmitter 301 to align the optical detectors 305c, 305b, and/or 305a with the laser beam 302. The order wire 309 may comprise a narrowband radio frequency (RF) connection and the receiver 304 may include a RF data radio to share position information with the transmitter 301 via the narrowband RF order wire 309. The receiver 304 may utilize the terrain information and/or the position information of the transmitter 301 to compute a geometric projection of the modulation of the data in the laser beam and may adjust an aperture of the optical detector(s) 305c, 305b, and/or 305a based on the geometric projection to minimize intersymbol interference and maximize the communication channel benefits associated with spatial and temporal diversity.

The transmitter may modulate the laser beam 303 with the same data at the first segment 303c at the first time, the second segment 303b at the second time, and the third segment 303a at the third time. The receiver 304 may phase the signal received by the optical detector 305c, the signal received by the optical detector 305b, and/or the signal received by the optical detector 305a to match the phase of each of the signals with the other signals. A data clock may be recovered by well known methods including, but not limited to, Manchester encoding and decoding. This recovered clock may be utilized to identify bit boundaries, maximizing energy collected for each bit. By matching the phase of each of the signals with the other signals, each of the signals may be modulated with the same data. After phasing the signal received by the optical detector 305c, the signal received by the optical detector 305b, and/or the signal received by the optical detector 305a, the receiver 304 may sum 307 the signal received by the optical detector 305c, the signal received by the optical detector 305b, and/or the signal received by the optical detector 305a to produce a summed signal. By summing the separate signals, which are modulated with the same data, the power, the uncorrelated power-to-noise ratio, and/or the data rate of the summed signal may yield an improved aggregate signal over the individual signals. The summed signal may be recorded in a tangible medium including, but not limited to, a memory, a register, a compact disk, a hard disk, and/or a floppy disk. The summed signal may displayed utilizing a display device including, but not limited to, a cathode-ray tube display, a liquid crystal display, a speaker, a graphic equalizer, and/or a printer. The receiver 304 may process the signal received by the optical detector 305c, the signal received by the optical detector 305b, and/or the signal received by the optical detector 305a utilizing spread spectrum analysis to suppress noise relative to the signal (i.e. processing gain). The receiver 304 may process the summed signal utilizing spread spectrum analysis to suppress noise relative to the signal (i.e. processing gain). The receiver 304 may demodulate the summed signal to obtain the data. The data may be recorded in a tangible medium including, but not limited to, a memory, a register, a compact disk, a hard disk, and/or a floppy disk. The data may displayed utilizing a display device including, but not limited to, a cathode-ray tube display, a liquid crystal display, a speaker, a graphic equalizer, and/or a printer.

Although this embodiment has been described with three optical detectors, it should be understood that different numbers of optical detectors, such as two or fifty, may be utilized without departing from the scope of the present disclosure. The transmitter 301 may utilize one or more laser diodes of various power levels and wavelengths (utilizing any optical band) (including, but not limited to, green, blue, and/or blue violet) to modulate and project the laser beam 302. The optical detectors 305c, 305b, and 305c may include an adjustable optical field of view and gain to minimize background light noise and to demodulate the received scattered laser beam light. The adjustable optical field of view may be manually adjustable or automatically adjustable (including, but not limited to, open and/or closed feedback methods relying on position and received Bit-Error-Rate (BER)). The optical detectors 305c, 305b, and/or 305c may include one or more filters for controlling the light wavelength received by the optical detectors 305c, 305b, and/or 305c. The transmitter 301 and/or the receiver 304 may be mounted at a fixed location, be mounted on a vehicle, and/or comprise a portable unit such as an equipment suitcase.

Figure 4:
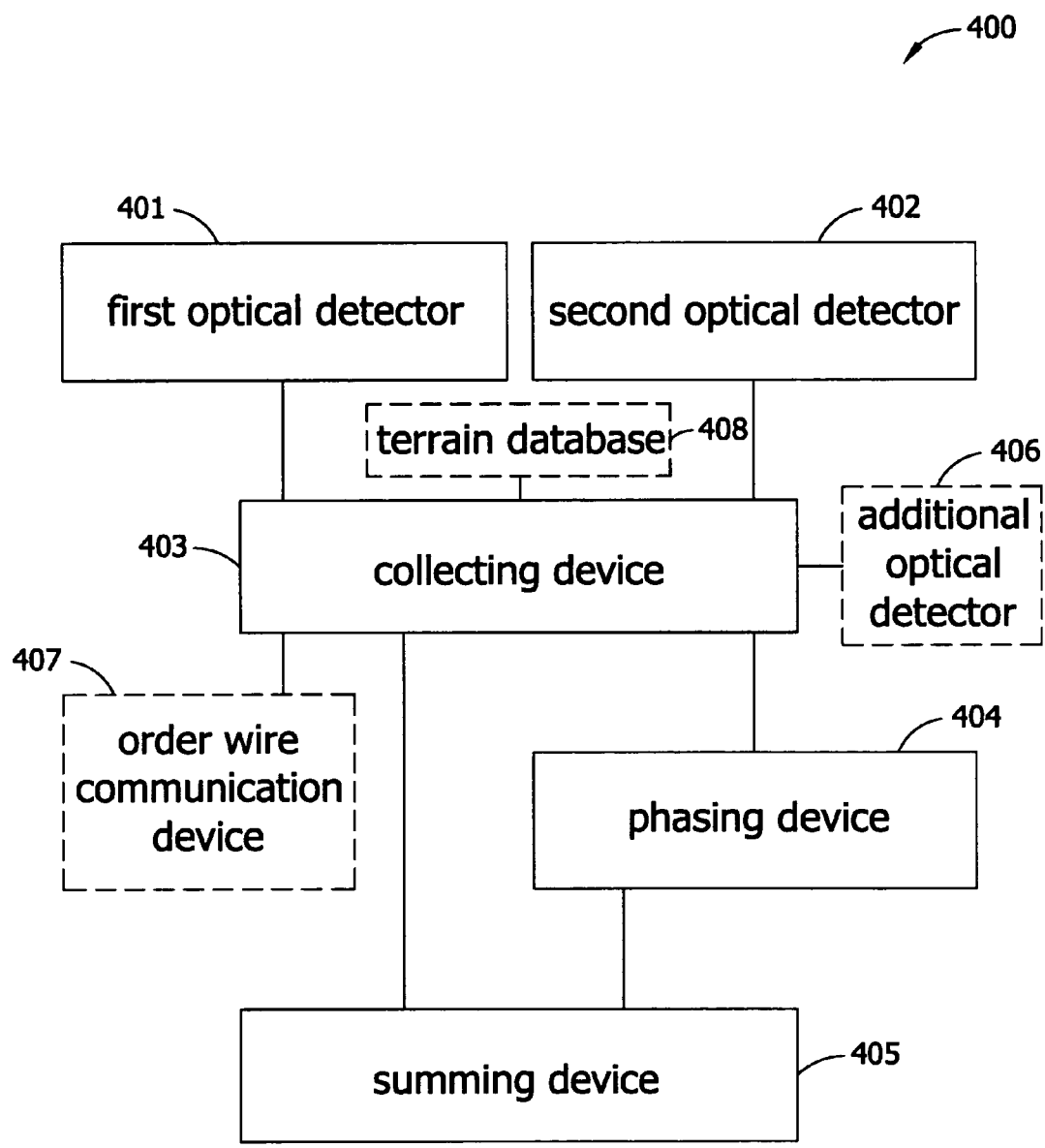
FIG. 4 a block diagram illustrating a receiver for receiving non-line-of-sight communications utilizing a laser beam, in accordance with an alternative embodiment of the present disclosure.

FIG. 4 illustrates a receiver 400 for receiving non-line-of-sight communications utilizing a laser beam, in accordance with an alternative embodiment of the present disclosure. The receiver 400 may include a first optical detector 401 and a second optical detector 402 coupled to a collecting device 403. The first optical detector 401 of receiver 400 may indirectly receive the light scattered by atmospheric scattering from a first segment of a laser beam, which has been modulated with data and projected over a horizon by a transmitter, at a first time and receive a first signal via the light scattered by atmospheric scattering from the first segment of the laser beam at the first time. The laser beam may comprise a single laser beam and/or an aggregate of a plurality of single laser beams. The second optical detector 402 of receiver 400 may indirectly receive the light scattered by atmospheric scattering from a second segment (spatial diversity) of the laser beam at a second time (temporal diversity) and receive a second signal via the light scattered by atmospheric scattering from the second segment of the laser beam at the second time. The receiver 400 may include an additional optical detector 406, coupled to the collecting device 403, that may indirectly receive the light scattered by atmospheric scattering from an additional segment (spatial diversity) of the laser beam at an additional time (temporal diversity) and receive an additional signal via the light scattered by atmospheric scattering from the additional segment of the laser beam at the additional time. The laser beam may be modulated with the same data at the first segment at the first time, the second segment at the second time, and the additional segment at the additional time. The optical detectors 402, 404, and/or 406 may each comprise an electronic device, an optical device, and/or a hybrid electronic/optical device.

The collecting device 403 may collect the first signal from the first optical detector 401 and/or the second signal from the second optical detector 402. The collecting device 403 may also collect the additional signal from the additional optical detector 406. A data clock may be recovered by well known methods including, but not limited to, Manchester encoding and decoding. This recovered clock may be utilized to identify bit boundaries, maximizing energy collected for each bit. By matching the phase of each of the signals with the other signals, each of the signals may be modulated with the same data. The collecting device 403 may process the first signal and/or the second utilizing spread spectrum analysis to suppress noise relative to the signal (i.e. processing gain). The collecting device may also process the additional signal utilizing spread spectrum analysis to suppress noise relative to the signal (i.e. processing gain).

The receiver 400 may include a phasing device 404 coupled to the collecting device 403. The receiver may include a summing device 405 coupled to the phasing device 404 and the collecting device 403. The phasing device 404 may phase the first signal to match the phase of the second signal in order to produce a phased signal. If the first signal is phased to match the phase of the second signal, the phased signal and the second signal may be modulated with the same data. The summing device 405 may sum the phased signal and the second signal to produce a summed signal. By summing the separate signals, which are modulated with the same data, the power, the uncorrelated power-to-noise ratio, and/or the data rate of the summed signal may yield an improved aggregate signal over the individual signals. The summed signal may be recorded in a tangible medium including, but not limited to, a memory, a register, a compact disk, a hard disk, and/or a floppy disk. The summed signal may displayed utilizing a display device including, but not limited to, a cathode-ray tube display, a liquid crystal display, a speaker, a graphic equalizer, and/or a printer. The summing device 405 may process the summed signal utilizing spread spectrum analysis to suppress noise relative to the signal (i.e. processing gain). The summing device 405 may demodulate the summed signal to obtain the data. The data may be recorded in a tangible medium including, but not limited to, a memory, a register, a compact disk, a hard disk, and/or a floppy disk. The data may displayed utilizing a display device including, but not limited to, a cathode-ray tube display, a liquid crystal display, a speaker, a graphic equalizer, and/or a printer.

Alternatively, the phasing device 404 may phase the second signal to match the phase of the first signal in order to produce the phased signal. If the second signal is phased to match the phase of the first signal, the phased signal and the first signal may be modulated with the same data. The summing device 405 may sum the phased signal and the first signal to produce a summed signal. By summing the separate signals, which are modulated with the same data, the power, the uncorrelated power-to-noise ratio, and/or the data rate of the summed signal may yield an improved aggregate signal over the individual signals. The summed signal may be recorded in a tangible medium including, but not limited to, a memory, a register, a compact disk, a hard disk, and/or a floppy disk. The summed signal may displayed utilizing a display device including, but not limited to, a cathode-ray tube display, a liquid crystal display, a speaker, a graphic equalizer, and/or a printer.

Alternatively, the phasing device 404 may phase the first signal to match the phase of the second signal in order to produce the phased signal. The phasing device 404 may also phase the additional signal to match the phase of the second signal in order to produce an additional phased signal. If the first signal is phased to match the phase of the second signal, the phased signal and the second signal may be modulated with the same data. If the additional signal is phased to match the phase of the second signal, the additional phased signal and the second signal may be modulated with the same data. The summing device 405 may sum the phased signal, the additional phased signal, and the second signal to produce a summed signal. By summing the separate signals, which are modulated with the same data, the power, the uncorrelated power-to-noise ratio, and/or the data rate of the summed signal may yield an improved aggregate signal over the individual signals. The summed signal may be recorded in a tangible medium including, but not limited to, a memory, a register, a compact disk, a hard disk, and/or a floppy disk. The summed signal may displayed utilizing a display device including, but not limited to, a cathode-ray tube display, a liquid crystal display, a speaker, a graphic equalizer, and/or a printer.

Alternatively, the phasing device 404 may phase the second signal to match the phase of the first signal in order to produce the phased signal. The phasing device 404 may also phase the additional signal to match the phase of the first signal in order to produce the additional phased signal. If the second signal is phased to match the phase of the first signal, the phased signal and the first signal may be modulated with the same data. If the additional signal is phased to match the phase of the first signal, the phased signal and the first signal may be modulated with the same data. The summing device 405 may sum the phased signal, the additional phased signal, and the first signal to produce a summed signal. By summing the separate signals, which are modulated with the same data, the power, the uncorrelated power-to-noise ratio, and/or the data rate of the summed signal may yield an improved aggregate signal over the individual signals. The summed signal may be recorded in a tangible medium including, but not limited to, a memory, a register, a compact disk, a hard disk, and/or a floppy disk. The summed signal may displayed utilizing a display device including, but not limited to, a cathode-ray tube display, a liquid crystal display, a speaker, a graphic equalizer, and/or a printer.

The receiving device 400 may include a terrain database 408. The terrain database 408 may include terrain information concerning one or more locations. Terrain information contained in the terrain database 408 may include, but is not limited to, information concerning land topography, land elevation, vegetation, man-made structures (including, but not limited to, buildings, vehicles, power lines, towers, antennas, roads, dams, bridges and/or landing strips), landforms, bodies of water, hazards, mountains, weather information, and/or airspace classifications. The receiving device 400 may include an order wire communication device 407 coupled to the collecting device 403. The order wire may comprise an inherently low-bandwidth wireless order wire. The collecting device 403 may share terrain information and/or position information with the transmitter through an order wire via the order wire communication device 407. The position information may comprise GPS (global positioning system) information. An order wire is a connection for sharing control information between a transmitter and a receiver. The collecting device 403 may utilize the terrain information and/or the position information of the transmitter to align the first optical detector 401 and/or the second optical detector 402 with the laser beam. The collecting device 403 may utilize the terrain information and/or the position information of the transmitter to align the additional optical detector 406 with the laser beam. The order wire may comprise a narrowband radio frequency (RF) connection and the order wire communication device 407 may include a RF data radio communication device. The collecting device 403 may utilize the terrain information and/or the position information of the transmitter to compute a geometric projection of the modulation of the data in the laser beam and may adjust an aperture of the first optical detector 401 and/or the second optical detector 402 based on the geometric projection to minimize intersymbol interference and maximize the communication channel benefits associated with spatial and temporal diversity. The collecting device 403 may utilize the terrain information and/or the position information of the transmitter to compute a geometric projection of the modulation of the data in the laser beam and may adjust an aperture of the additional optical detector 406 based on the geometric projection to minimize intersymbol interference and maximize the communication channel benefits associated with spatial and temporal diversity.

Although this embodiment has been described with two (or, optionally, three) optical detectors, it should be understood that different numbers of optical detectors, such as five or fifty, may be utilized without departing from the scope of the present disclosure. The first optical detector 401, the second optical detector 402, and/or the additional optical detector 406 may include an adjustable optical field of view and gain to minimize background light noise and to demodulate the received scattered laser beam light. The first optical detector 401, the second optical detector 402, and/or the additional optical detector 406 may include one or more filters for controlling the light received by the first optical detector 401, the second optical detector 402, and/or the additional optical detector 406. The receiver 400 may be mounted at a fixed location, be mounted on a vehicle, and/or comprise a portable unit such as a suitcase.

Figure 5:
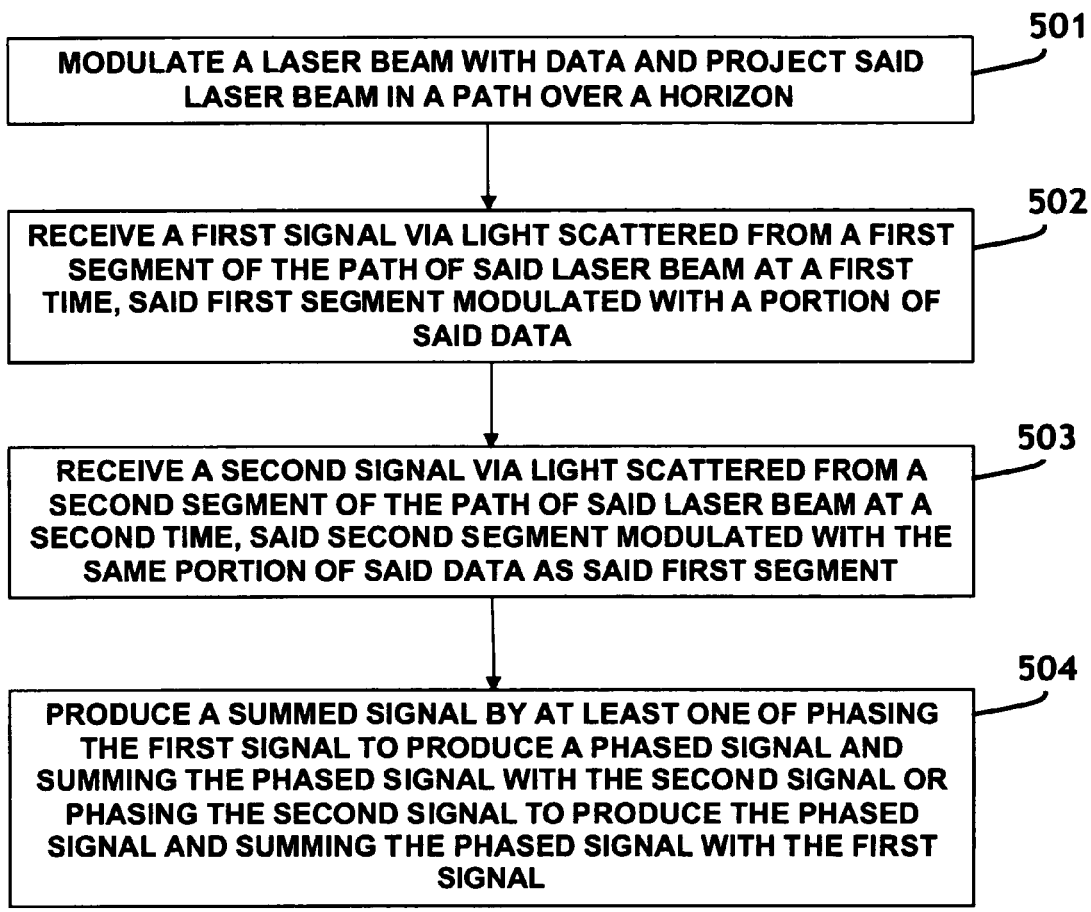
FIG. 5 is a flow diagram illustrating a method of receiving data, transmitted via a laser beam, utilizing a phased optic array, in accordance with an embodiment of the present disclosure.

FIG. 5 illustrates a method of receiving data, transmitted via a laser beam, utilizing a phased optic array, in accordance with an embodiment of the present disclosure. In step 501, modulate a laser beam with data and project said laser beam in a path over a horizon. In step 502, receive a first signal via light scattered from a first segment of the path of said laser beam at a first time, said first segment modulated with a portion of said data. The first signal may be processed utilizing spread spectrum analysis to suppress noise relative to the signal (i.e. processing gain). In step 503, receive a second signal via light scattered from a second segment of the path of said laser beam at a second time, said second segment modulated with the same portion of said data as said first segment. The second signal may be processed utilizing spread spectrum analysis to suppress noise relative to the signal (i.e. processing gain). In step 504, produce a summed signal by at least one of phasing the first signal to produce a phased signal and summing the phased signal with the second signal or phasing the second signal to produce the phased signal and summing the phased signal with the first signal. The summed signal may be processed utilizing spread spectrum analysis to suppress noise relative to the signal (i.e. processing gain). The summed signal may be demodulated to obtain the data. The data may be recorded in a tangible medium including, but not limited to, a memory, a register, a compact disk, a hard disk, and/or a floppy disk. The data may displayed utilizing a display device including, but not limited to, a cathode-ray tube display, a liquid crystal display, a speaker, a graphic equalizer, and/or a printer.

Figure 6:
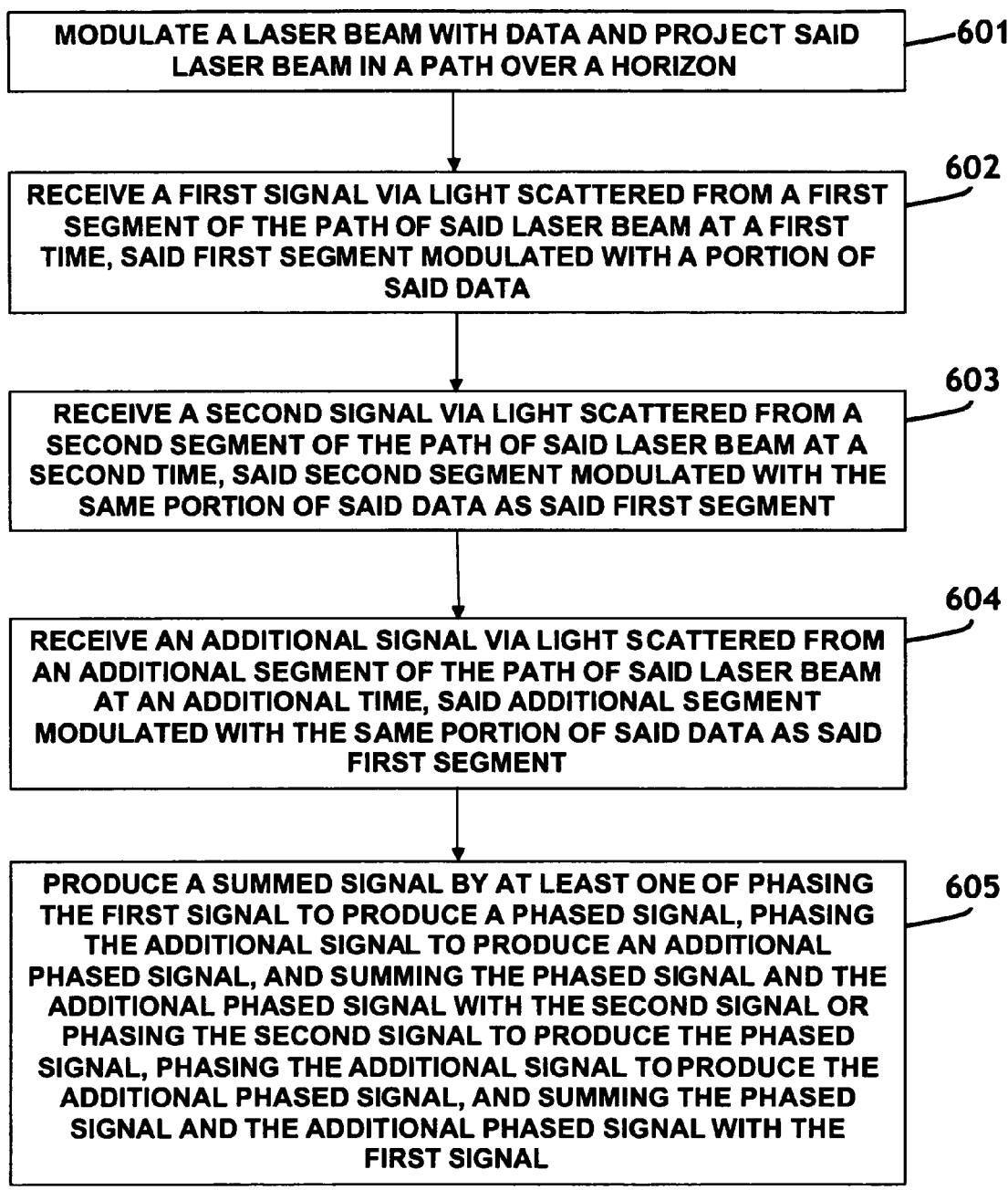
FIG. 6 is a flow diagram illustrating a method of receiving data, transmitted via a laser beam, utilizing a phased optic array, in accordance with an alternative embodiment of the present disclosure.

FIG. 6 illustrates a method of receiving data, transmitted via a laser beam, utilizing a phased optic array, in accordance with an alternative embodiment of the present disclosure. In step 601, modulate a laser beam with data and project said laser beam in a path over a horizon. In step 602, receive a first signal via light scattered from a first segment of the path of said laser beam at a first time, said first segment modulated with a portion of said data. The first signal may be processed utilizing spread spectrum analysis to suppress noise relative to the signal (i.e. processing gain). In step 603, receive a second signal via light scattered from a second segment of the path of said laser beam at a second time, said second segment modulated with the same portion of said data as said first segment. The second signal may be processed utilizing spread spectrum analysis to suppress noise relative to the signal (i.e. processing gain). In step 604, receive an additional signal via light scattered from an additional segment of the path of said laser beam at an additional time, said additional segment modulated with the same portion of said data as said first segment. The additional signal may be processed utilizing spread spectrum analysis to suppress noise relative to the signal (i.e. processing gain). In step 605, produce a summed signal by at least one of phasing the first signal to produce a phased signal, phasing the additional signal to produce an additional phased signal, and summing the phased signal and the additional phased signal with the second signal or phasing the second signal to produce the phased signal, phasing the additional signal to produce the additional phased signal, and summing the phased signal and the additional phased signal with the first signal. The summed signal may be processed utilizing spread spectrum analysis to suppress noise relative to the signal (i.e. processing gain). The summed signal may be demodulated to obtain the data. The data may be recorded in a tangible medium including, but not limited to, a memory, a register, a compact disk, a hard disk, and/or a floppy disk. The data may displayed utilizing a display device including, but not limited to, a cathode-ray tube display, a liquid crystal display, a speaker, a graphic equalizer, and/or a printer.

Figure 7:
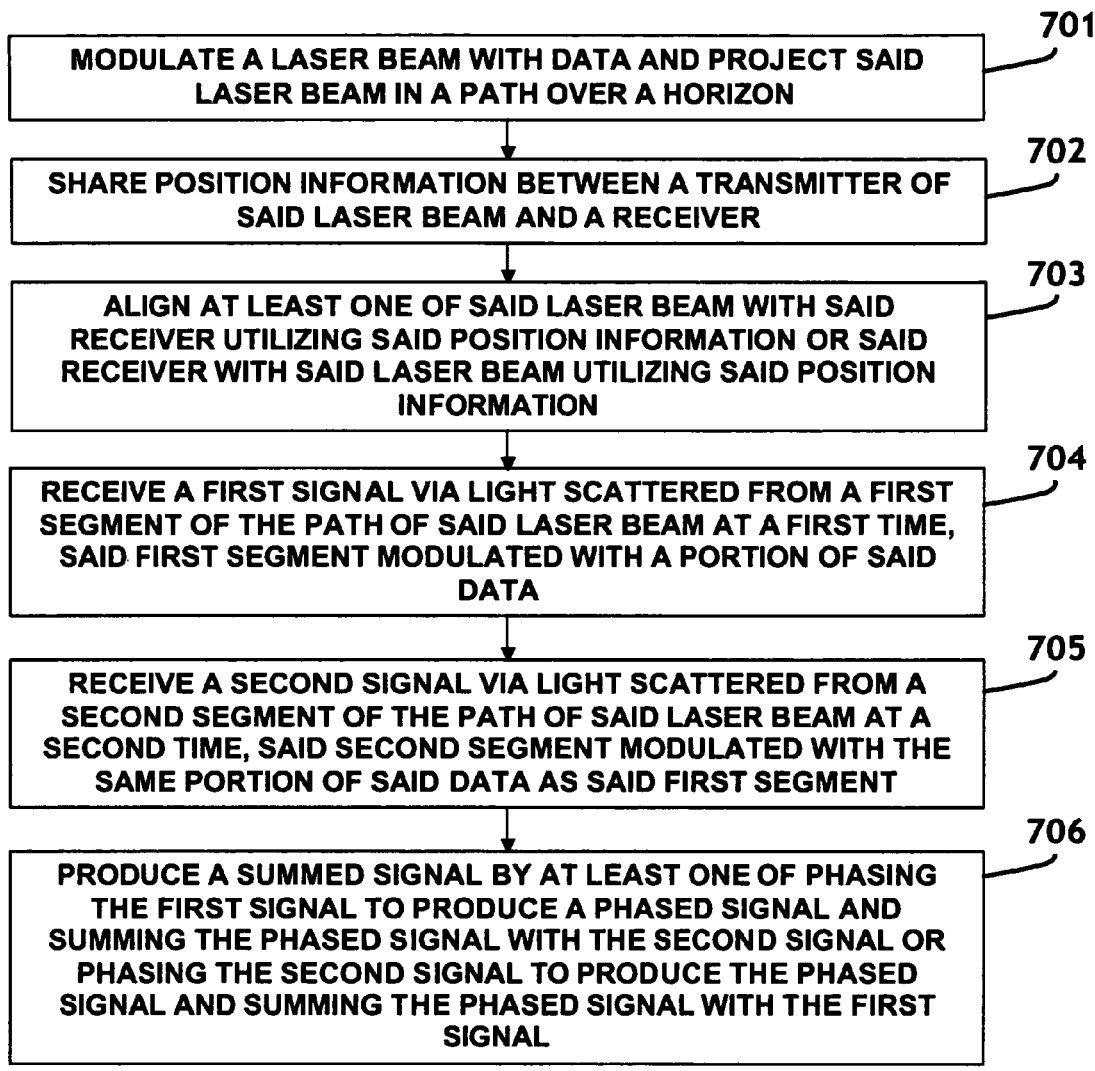
FIG. 7 is a flow diagram illustrating a method of receiving data, transmitted via a laser beam, utilizing a phased optic array, in accordance with an alternative embodiment of the present disclosure.

FIG. 7 illustrates a method of receiving data, transmitted via a laser beam, utilizing a phased optic array, in accordance with an alternative embodiment of the present disclosure. In step 701, modulate a laser beam with data and project said laser beam in a path over a horizon. In step 702, share position information between a transmitter of said laser beam and a receiver. Sharing position information between a transmitter of said laser beam and a receiver may comprise sharing position information between a transmitter of said laser beam and a receiver via a narrowband RF connection. Alternatively, sharing position information between a transmitter of said laser beam and a receiver may comprise sharing position information between a transmitter of said laser beam and a receiver via an orderwire. The order wire may comprise an inherently low-bandwidth wireless order wire. The position information may comprise GPS (global positioning system) information. In step 703, align at least one of said laser beam with said receiver utilizing said position information or said receiver with said laser beam utilizing said position information. In step 704, receive a first signal via light scattered from a first segment of the path of said laser beam at a first time, said first segment modulated with a portion of said data. The first signal may be processed utilizing spread spectrum analysis to suppress noise relative to the signal (i.e. processing gain). In step 705, receive a second signal via light scattered from a second segment of the path of said laser beam at a second time, said second segment modulated with the same portion of said data as said first segment. The second signal may be processed utilizing spread spectrum analysis to suppress noise relative to the signal (i.e. processing gain). In step 706, produce a summed signal by at least one of phasing the first signal to produce a phased signal and summing the phased signal with the second signal or phasing the second signal to produce the phased signal and summing the phased signal with the first signal. The summed signal may be processed utilizing spread spectrum analysis to suppress noise relative to the signal (i.e. processing gain). The summed signal may be demodulated to obtain the data. The data may be recorded in a tangible medium including, but not limited to, a memory, a register, a compact disk, a hard disk, and/or a floppy disk. The data may displayed utilizing a display device including, but not limited to, a cathode-ray tube display, a liquid crystal display, a speaker, a graphic equalizer, and/or a printer.

Figure 8:
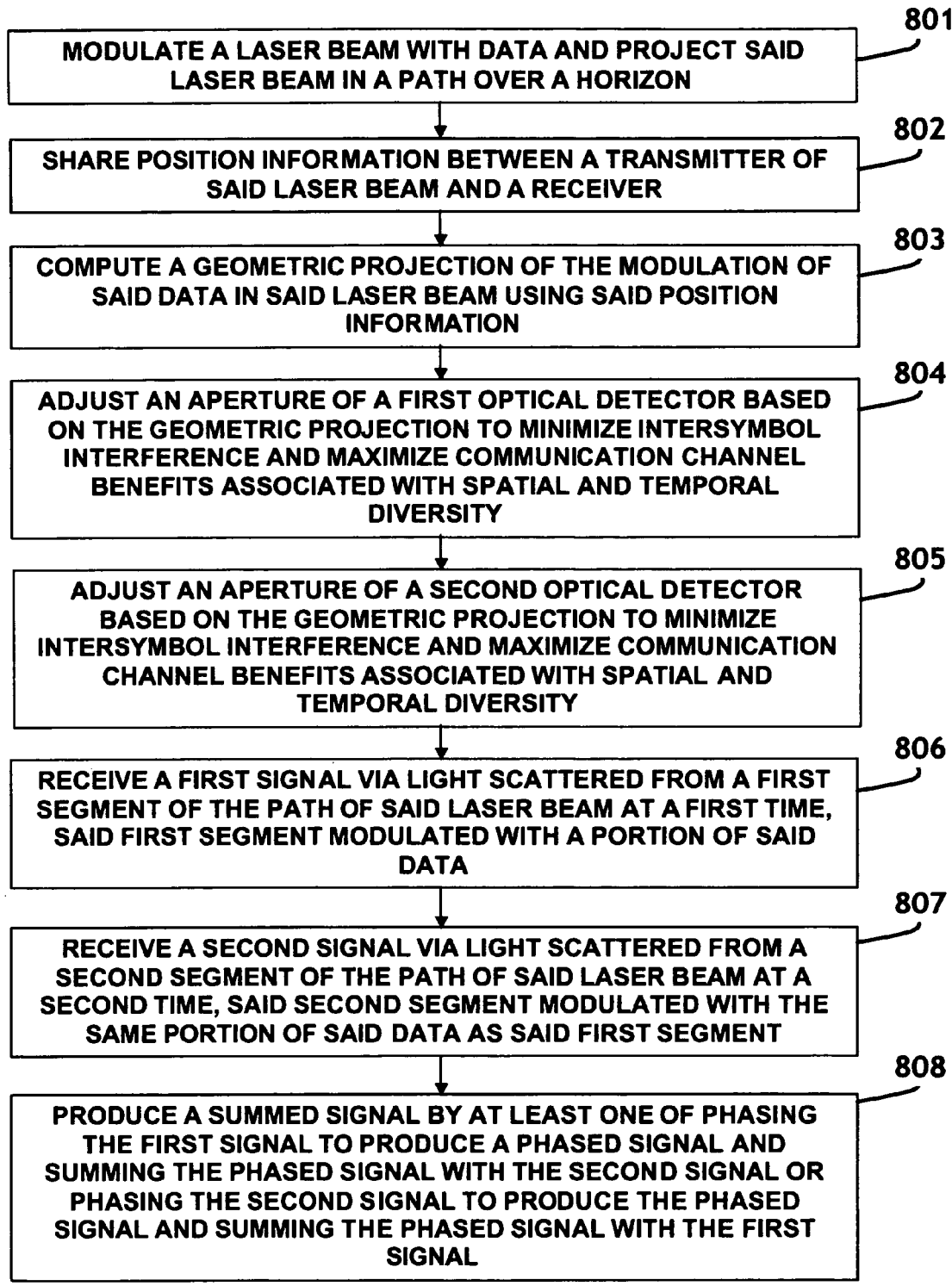
FIG. 8 is a flow diagram illustrating a method of receiving data, transmitted via a laser beam, utilizing a phased optic array, in accordance with an alternative embodiment of the present disclosure.

FIG. 8 illustrates a method of receiving data, transmitted via a laser beam, utilizing a phased optic array, in accordance with an alternative embodiment of the present disclosure. In step 801, modulate a laser beam with data and project said laser beam in a path over a horizon. In step 802, share position information between a transmitter of said laser beam and a receiver. Sharing position information between a transmitter of said laser beam and a receiver may comprise sharing position information between a transmitter of said laser beam and a receiver via a narrowband RF connection. Alternatively, sharing position information between a transmitter of said laser beam and a receiver may comprise sharing position information between a transmitter of said laser beam and a receiver via an orderwire. The order wire may comprise an inherently low-bandwidth wireless order wire. The position information may comprise GPS (global positioning system) information. In step 803, compute a geometric projection of the modulation of said data in said laser beam using said position information. In step 804, adjust an aperture of a first optical detector based on the geometric projection to minimize intersymbol interference and maximize communication channel benefits associated with spatial and temporal diversity. In step 805, adjust an aperture of a second optical detector based on the geometric projection to minimize intersymbol interference and maximize communication channel benefits associated with spatial and temporal diversity. In step 806, receive a first signal via light scattered from a first segment of the path of said laser beam at a first time, said first segment modulated with a portion of said data. The first signal may be processed utilizing spread spectrum analysis to suppress noise relative to the signal (i.e. processing gain). In step 807, receive a second signal via light scattered from a second segment of the path of said laser beam at a second time, said second segment modulated with the same portion of said data as said first segment. The second signal may be processed utilizing spread spectrum analysis to suppress noise relative to the signal (i.e. processing gain). In step 808, produce a summed signal by at least one of phasing the first signal to produce a phased signal and summing the phased signal with the second signal or phasing the second signal to produce the phased signal and summing the phased signal with the first signal. The summed signal may be processed utilizing spread spectrum analysis to suppress noise relative to the signal (i.e. processing gain). The summed signal may be demodulated to obtain the data. The data may be recorded in a tangible medium including, but not limited to, a memory, a register, a compact disk, a hard disk, and/or a floppy disk. The data may displayed utilizing a display device including, but not limited to, a cathode-ray tube display, a liquid crystal display, a speaker, a graphic equalizer, and/or a printer.

Figure 9:
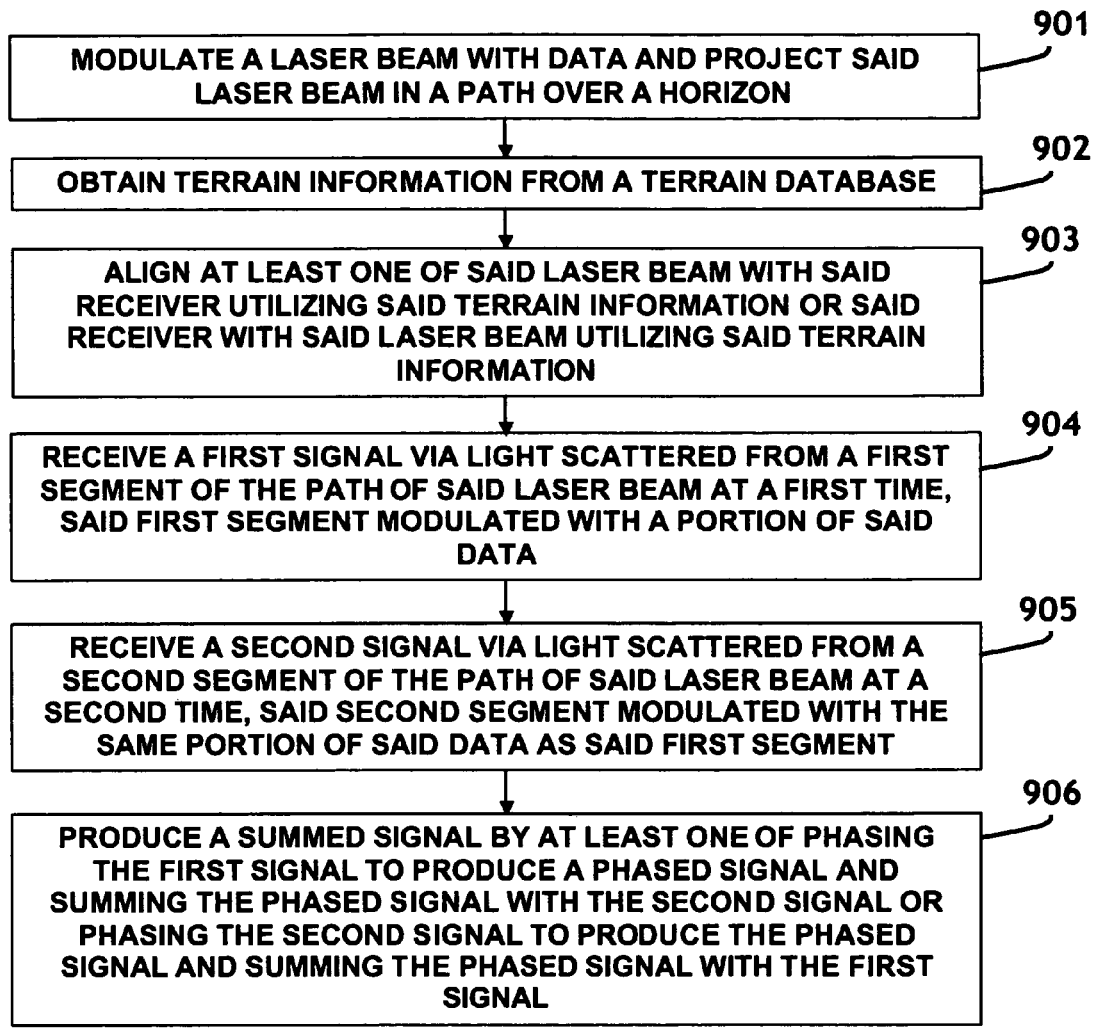
FIG. 9 is a flow diagram illustrating a method of receiving data, transmitted via a laser beam, utilizing a phased optic array, in accordance with an alternative embodiment of the present disclosure.

FIG. 9 illustrates a method of receiving data, transmitted via a laser beam, utilizing a phased optic array, in accordance with an alternative embodiment of the present disclosure. In step 901, modulate a laser beam with data and project said laser beam in a path over a horizon. In step 902, obtain terrain information from a terrain database. In step 903, align at least one of said laser beam with said receiver utilizing said terrain information or said receiver with said laser beam utilizing said terrain information. In step 904, receive a first signal via light scattered from a first segment of the path of said laser beam at a first time, said first segment modulated with a portion of said data. The first signal may be processed utilizing spread spectrum analysis to suppress noise relative to the signal (i.e. processing gain). In step 905, receive a second signal via light scattered from a second segment of the path of said laser beam at a second time, said second segment modulated with the same portion of said data as said first segment. The second signal may be processed utilizing spread spectrum analysis to suppress noise relative to the signal (i.e. processing gain). In step 906, produce a summed signal by at least one of phasing the first signal to produce a phased signal and summing the phased signal with the second signal or phasing the second signal to produce the phased signal and summing the phased signal with the first signal. The summed signal may be processed utilizing spread spectrum analysis to suppress noise relative to the signal (i.e. processing gain). The summed signal may be demodulated to obtain the data. The data may be recorded in a tangible medium including, but not limited to, a memory, a register, a compact disk, a hard disk, and/or a floppy disk. The data may displayed utilizing a display device including, but not limited to, a cathode-ray tube display, a liquid crystal display, a speaker, a graphic equalizer, and/or a printer.

Figure 10:
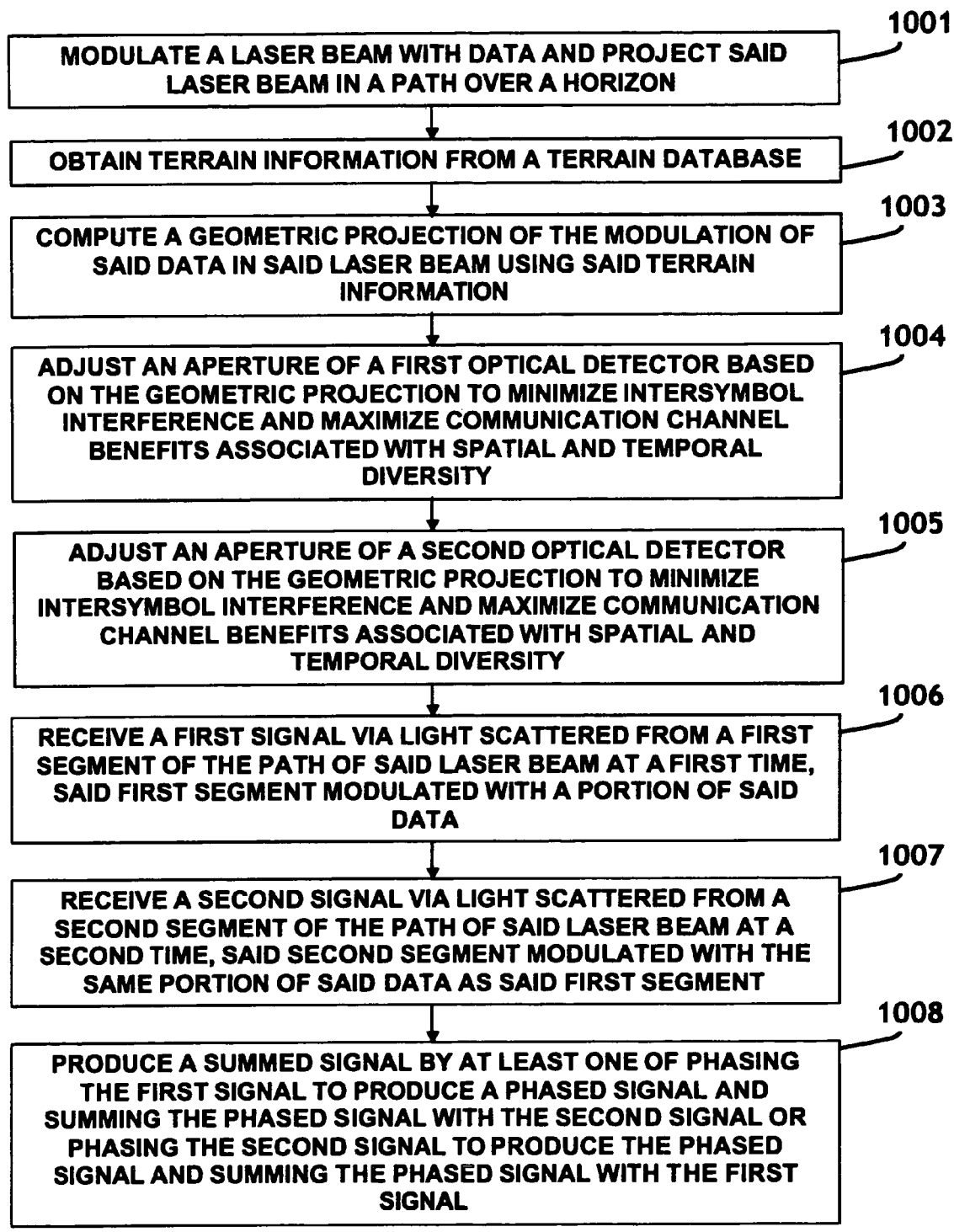
FIG. 10 is a flow diagram illustrating a method of receiving data, transmitted via a laser beam, utilizing a phased optic array, in accordance with an alternative embodiment of the present disclosure.

FIG. 10 illustrates a method of receiving data, transmitted via a laser beam, utilizing a phased optic array, in accordance with an alternative embodiment of the present disclosure. In step 1001, modulate a laser beam with data and project said laser beam in a path over a horizon. In step 1002, obtain terrain information from a terrain database. In step 1003, compute a geometric projection of the modulation of said data in said laser beam using said terrain information. In step 1004, adjust an aperture of a first optical detector based on the geometric projection to minimize intersymbol interference and maximize communication channel benefits associated with spatial and temporal diversity. In step 1005, adjust an aperture of a second optical detector based on the geometric projection to minimize intersymbol interference and maximize communication channel benefits associated with spatial and temporal diversity. In step 1006, receive a first signal via light scattered from a first segment of the path of said laser beam at a first time, said first segment modulated with a portion of said data. The first signal may be processed utilizing spread spectrum analysis to suppress noise relative to the signal (i.e. processing gain). In step 1007, receive a second signal via light scattered from a second segment of the path of said laser beam at a second time, said second segment modulated with the same portion of said data as said first segment. The second signal may be processed utilizing spread spectrum analysis to suppress noise relative to the signal (i.e. processing gain). In step 1008, produce a summed signal by at least one of phasing the first signal to produce a phased signal and summing the phased signal with the second signal or phasing the second signal to produce the phased signal and summing the phased signal with the first signal. The summed signal may be processed utilizing spread spectrum analysis to suppress noise relative to the signal (i.e. processing gain). The summed signal may be demodulated to obtain the data. The data may be recorded in a tangible medium including, but not limited to, a memory, a register, a compact disk, a hard disk, and/or a floppy disk. The data may displayed utilizing a display device including, but not limited to, a cathode-ray tube display, a liquid crystal display, a speaker, a graphic equalizer, and/or a printer.

Although the present disclosure has been described in the context of ground to ground communication scenarios, it should be understood that the present disclosure may be utilized in other communications scenarios without departing from the scope of the present disclosure. For example, the present disclosure may be utilized in communication scenarios including, but not limited to, ground-to-ground communications scenarios, air-to-ground communications scenarios, and/or air-to-air communication scenarios.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A system, comprising:
a transmitter, said transmitter configured to modulate a laser beam with data and project said laser beam in a path over a horizon;
a receiver;
a first optical detector, coupled to said receiver, said first optical detector configured to receive a first signal via light scattered from a first segment of the path of said laser beam at a first time; and
a second optical detector, coupled to said receiver, said second optical detector configured to receive a second signal via light scattered from a second segment of the path of said laser beam at a second time,
wherein said transmitter modulates said first segment with a portion of said data and said transmitter modulates said second segment with the same portion of said data as said first segment, said receiver collects the first signal and the second signal, and said receiver produces a summed signal by at least one of phasing the first signal to produce a phased signal and summing the phased signal with the second signal or phasing the second signal to produce the phased signal and summing the phased signal with the first signal,
wherein said transmitter and said receiver share position information via an order wire and at least one of said receiver utilizes said position information to align said first optical detector and said second optical detector with said laser beam or said transmitter utilizes said position information to align said laser beam with said first optical detector and said second optical detector, and
wherein said receiver utilizes said position information to compute a geometric projection of the modulation of said data in said laser beam, adjusts an aperture of said first optical detector based on the geometric projection to minimize intersymbol interference and maximize communication channel benefits associated with spatial and temporal diversity, and adjusts an aperture of said second optical detector based on the geometric projection to minimize intersymbol interference and maximize communication channel benefits associated with spatial and temporal diversity.

2. A system, comprising:
a transmitter, said transmitter configured to modulate a laser beam with data and project said laser beam in a path over a horizon;
a receiver;
a first optical detector, coupled to said receiver, said first optical detector configured to receive a first signal via light scattered from a first segment of the path of said laser beam at a first time; and
a second optical detector, coupled to said receiver, said second optical detector configured to receive a second signal via light scattered from a second segment of the path of said laser beam at a second time,
wherein said transmitter modulates said first segment with a portion of said data and said transmitter modulates said second segment with the same portion of said data as said first segment, said receiver collects the first signal and the second signal, and said receiver produces a summed signal by at least one of phasing the first signal to produce a phased signal and summing the phased signal with the second signal or phasing the second signal to produce the phased signal and summing the phased signal with the first signal,
wherein said transmitter and said receiver share position information via an order wire and at least one of said receiver utilizes said position information to align said first optical detector and said second optical detector with said laser beam or said transmitter utilizes said position information to align said laser beam with said first optical detector and said second optical detector, and
wherein said receiver includes a terrain database containing terrain information and at least one of said receiver utilizes said terrain information to align said first optical detector and said second optical detector with said laser beam or said receiver shares said terrain information with said transmitter via an order wire, and
wherein said receiver utilizes said terrain information to compute a geometric projection of the modulation of said data in said laser beam, adjusts an aperture of said first optical detector based on the geometric projection to minimize intersymbol interference and maximize communication channel benefits associated with spatial and temporal diversity, and adjusts an aperture of said second optical detector based on the geometric projection to minimize intersymbol interference and maximize communication channel benefits associated with spatial and temporal diversity.

3. A method, comprising:
modulating a laser beam with data and projecting said laser beam in a path over a horizon;
receiving a first signal via light scattered from a first segment of the path of said laser beam at a first time, said first segment modulated with a portion of said data;
receiving a second signal via light scattered from a second segment of the path of said laser beam at a second time, said second segment modulated with the same portion of said data as said first segment;
producing a summed signal by at least one of phasing the first signal to produce a phased signal and summing the phased signal with the second signal or phasing the second signal to produce the phased signal and summing the phased signal with the first signal;
sharing position information between a transmitter of said laser beam and a receiver;
aligning at least one of said laser beam with said receiver utilizing said position information or said receiver with said laser beam utilizing said position information;
computing a geometric projection of the modulation of said data in said laser beam utilizing said position information;
adjusting an aperture of a first optical detector based on the geometric projection to minimize intersymbol interference and maximize communication channel benefits associated with spatial and temporal diversity; and
adjusting an aperture of a second optical detector based on the geometric projection to minimize intersymbol interference and maximize communication channel benefits associated with spatial and temporal diversity.

4. A method, comprising:
modulating a laser beam with data and projecting said laser beam in a path over a horizon;

receiving a first signal via light scattered from a first segment of the path of said laser beam at a first time, said first segment modulated with a portion of said data;

receiving a second signal via light scattered from a second segment of the path of said laser beam at a second time, said second segment modulated with the same portion of said data as said first segment;

producing a summed signal by at least one of phasing the first signal to produce a phased signal and summing the phased signal with the second signal or phasing the second signal to produce the phased signal and summing the phased signal with the first signal;

obtaining terrain information from a terrain database;

aligning at least one of said laser beam with said receiver utilizing said terrain information or said receiver with said laser beam utilizing said terrain information;

computing a geometric projection of the modulation of said data in said laser beam utilizing said terrain information;

adjusting an aperture of a first optical detector based on the geometric projection to minimize intersymbol interference and maximize communication channel benefits associated with spatial and temporal diversity; and adjusting an aperture of a second optical detector based on the geometric projection to minimize intersymbol interference and maximize communication channel benefits associated with spatial and temporal diversity.

5. A receiver, comprising:

a first optical detector configured to receive a first signal via light scattered from a first segment of a path of a laser beam at a first time;

a second optical detector configured to receive a second signal via light scattered from a second segment of the path of said laser beam at a second time;

a collecting device, coupled to said first optical detector and said second optical detector, configured to collect the first signal and the second signal;

a phasing device, coupled to said collecting device, configured to produce a phased signal;

a summing device, coupled to said phasing device and said collecting device, configured to produce a summed signal; and an order wire communication device, coupled to said collection device, configured to share position information with a transmitter via said order wire;

wherein said collection device is configured to compute a geometric projection of the modulation of said data in said laser beam, adjust an aperture of said first optical detector based on the geometric projection to minimize intersymbol interference and maximize communication channel benefits associated with spatial and temporal diversity, and adjust an aperture of said second optical detector based on the geometric projection to minimize intersymbol interference and maximize communication channel benefits associated with spatial and temporal diversity, and wherein said laser beam is modulated with data, said first segment is modulated with a portion of said data, said second segment is modulated with the same portion of said data as said first segment, and at least one of said phasing device produces the phased signal by phasing the first signal and the summing device produces the summed signal by summing the phased signal with the second signal or said phasing device produces the phased signal by phasing the second signal and the summing device produces the summed signal by summing the phased signal with the first signal.

* * * * *